Sept. 5, 1933.  O. WITTEL  1,925,552
PHOTOGRAPHIC OPTICAL SYSTEM
Filed Jan. 20, 1931
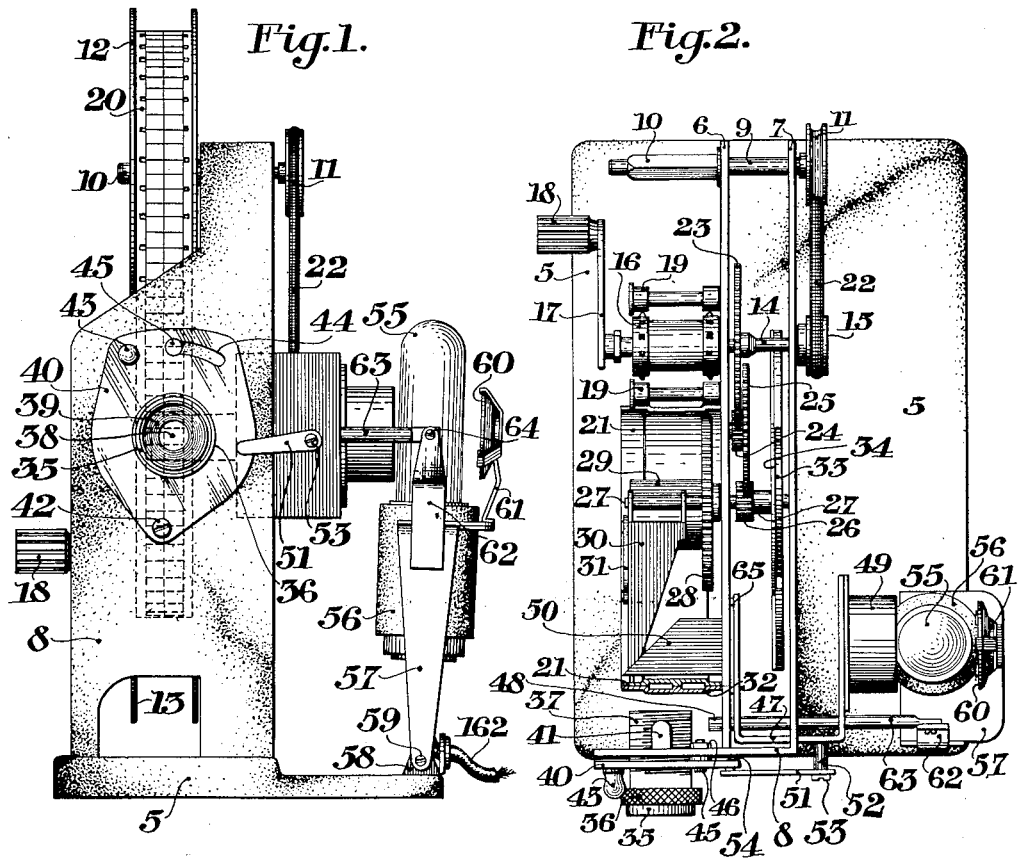
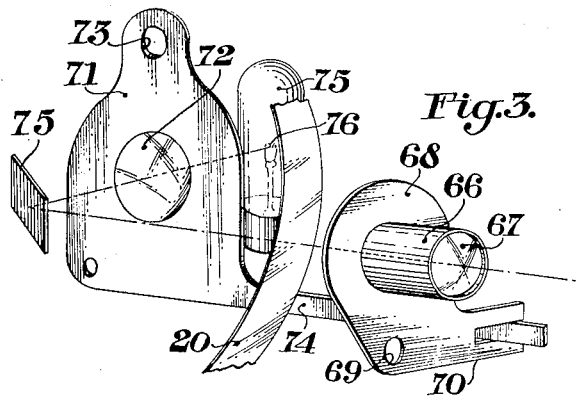
Inventor
Otto Wittel,
By Newton M. Perrins
George A. Gillette, Jr.
Attorneys Patented Sept. 5, 1933

1,925,552

UNITED STATES PATENT OFFICE 1,925,552

PHOTOGRAPHIC OPTICAL SYSTEM

Otto Wittel, Rochester, N. Y., assignor to Eastman Kodak Company, Rochester, N. Y., a corporation of New York Application January 20, 1931. Serial No. 509,993

17 Claims. (Cl. 88—16)

The present invention relates to a photographic optical system and more particularly to an optical system for motion picture apparatus using film with laterally adjacent series of frames progressive in opposite directions.

In known motion picture apparatus for film having two side by side rows of successive frames progressive in opposite directions, it has been the practice to shift the feed and pull-down mechanisms of the apparatus with respect to the optical system in order to bring the desired successive row of frames on the film into optical relation with the optical system. Obviously such shifting of the feed and pull-down mechanisms greatly complicates the construction of such motion picture apparatus and materially increases the cost thereof.

The primary object of this invention is the provision of an optical system for motion picture apparatus which is movable with respect to the film, feed and pull-down mechanisms.

Another object of the invention is the provision of an optical system adapted to be shifted into optical relation with either of the laterally adjacent frames on the film.

Still another object of the invention is the provision of a shiftable optical system having an angular optical axis including an objective means adapted to move in a plane perpendicular to one leg of the axis and including a condenser means adapted to move either along the other leg of the axis or in a plane parallel thereto.

A further object of the invention is the provision of an interconnecting mechanical means between the objective means and condenser means to effect simultaneous movement thereof. A still further object of the invention is the provision of a shiftable optical system in a motion picture projector wherein the light source is at a constant distance along the optical axis from the film and objective means.

Other objects of the invention will be obvious to those skilled in the motion picture art as the description of said invention is related hereinafter.

The optical system of the invention in the broadest sense comprises an objective means and a condenser means, each simultaneously movable by an interconnecting mechanical means. The optical system is specially adapted to motion picture apparatus and preferably adapted to use in a motion picture projector having an angular optical axis. Two specific embodiments of the angular optical system of the invention are disclosed and in each the objective means is mounted to move in a plane normal to one leg of the angular optical axis while in the preferred form of the invention the condenser means moves along the other leg of the angular optical axis and in the other form said condenser means moves in a plane normal also to the other leg of the angular optical axis.

Reference is now made to the accompanying drawing wherein like reference numerals designate similar elements and wherein:

Fig. 1 is a front view of a motion picture projector equipped with the preferred form of shiftable angular optical system in one position.

Fig. 2 is a top view of the motion picture projector also showing the preferred form of optical system but shifted to the other position.

Fig. 3 is an isometric view of another specific embodiment of the invention.

In the illustrated embodiments of the invention, the shiftable optical system is shown as applied to a motion picture projector but it is understood that it is within the scope of the invention that said shiftable optical system may be adapted to other motion picture apparatus such as printers and cameras.

In the following description and claims certain movements are defined as being in a plane parallel to the plane of the objective, objective lenses, condenser or condenser lenses and the ordinary construction is to be placed on this phrase. That is, the plane of a lens is a plane passing through the optical center of the lens and perpendicular to the optical axis thereof.

Referring now to the drawing, the preferred illustrated embodiment comprises a motion picture projector having a base 5, two walls 6 and 7 centrally and longitudinally located on said base 5 in spaced relation to each other and a front plate 8 attached and perpendicular both to base 5 and walls 6 and 7.

The reeling mechanism for the projector is of a known type and includes a shaft 9 rotatably mounted between walls 6 and 7, having a square-round portion 10 and extending beyond wall 7 to receive a fixed pulley 11. A reel 12 is detachably mounted on the square-round portion 10 of shaft 9 and a second reel 13 is similarly mounted directly below said reel 12. A second shaft 14 is also rotatably mounted between walls 6 and 7 and extends beyond wall 7 to receive a fixed pulley 15. A sprocket wheel 16, crank arm 17 and handle 18 are affixed to the other end of shaft 14 adjacent wall 6. A plurality of guiding rolls 19 are rotatably mounted on wall 6 adjacent the sprocket wheel 16 and located thereabout in a known manner so as to evenly conduct the film 20 from the supply reel, around sprocket wheel 16 to form a loop encircling the guideway 21 and to the take-up reel. Said loop also passes between guideway 21 and pressure pad 32 both provided with suitable laterally adjacent light apertures. A suitable pressure pad which may also be used is shown and described in my co-pending application, Serial No. 516,849 filed February 19, 1931, for Gate construction for motion picture machines.

A spring bolt 22 extends around pulleys 11 and 15, see Fig. 1, and is adapted to be removed from pulley 11 and to encircle pulley 15 and the pulley on the lower shaft for reel 13, see Fig. 2.

The pull-down mechanism includes a large gear 23 fixed on shaft 14 and meshing with a small pinion gear 24 rotatably mounted in wall 6. A second large gear 25 is integral with gear 24 and meshes with a small pinion gear 26 mounted on a shaft 27 which is rotatably mounted between walls 6 and 7. Shaft 27 extends through wall 6 and a large gear 28 is mounted fixedly on said shaft. Gear 28 engages a subjacent gear (not shown) which is integral with a drum 29. A pull down claw 30 is pivotally mounted on shaft 27 while link 31 extends between drum 29 and claw 30, being rotatably and eccentrically mounted on the end of drum 29 and being rotatably and intermediately attached to claw 30.

A rotary shutter 33 is fixed to the shaft 27 and has a centrifugally operated perforated sector 34 adapted to be resiliently moved into registry with the blades of the shutter when sufficient rotary speed is attained.

The previously described feeding and pull-down mechanisms do not per se form part of the present invention but merely function to pass the film from one reel to another through a gate with laterally adjacent light apertures and to return the film to the first reel upon shifting the spring belt 22 to the position shown in Figs. 1 and 2.

The novelty in the present invention resides in that the optical system is shiftable laterally with respect to the film, feeding and pull-down mechanism and in the specific construction for accomplishing the shift.

In the preferred form of the invention the optical system is made up of an objective means adapted to move in a plane and to pivotally swing in that plane, said plane being parallel to the plane of the objective or objective lens system. The objective means includes a lens barrel 35 having a knurled band 36 and a threaded portion 37 and containing an objective or objective lens system, one lens 38 of which is shown in Fig. 1 and which is held within said lens barrel 35 by a lens retaining collar 39.

The objective means also includes an objective lens mount plate 40 provided with a central aperture and having a plurality of surface threaded tongues 41 spaced around said aperture. Lens barrel 35 is inserted in said aperture with threaded portion 37 engaging the surfaces of tongues 41 so that the objective or objective lens system can be focused by turning said lens barrel 35, preferably by grasping knurled band 36.

The objective lens mount plate 40 is rotatably or pivotally mounted by means of a support such as a bolt 42 and has a small handle 43 mounted on the front surface to facilitate manual movement thereof. A stop means for the objective means to definitely locate the same in two positions may comprise an arcuate slot 44 in the objective lens mount plate 40 and a stud 45 fixed on the front plate 8 to engage said slot 44 and which is held on said front plate 8 by a nut 46, see Fig. 2, or any other stop device may be used which will definitely locate said objective means in the two positions.

When the objective means is moved to one extreme position the objective or objective lens system is properly positioned before one of the laterally adjacent frames on the film 20, see Fig. 1, and the stop means is definitely operative. Whereupon the objective means may be moved to the other extreme position, see Fig. 2, and said stop means again definitely positions said objective means before the other laterally adjacent frame on the film 20. Said movement may be accomplished manually or automatically as disclosed in my co-pending application Serial No. 524,051 filed March 20, 1931, Automatic reversing mechanism for motion picture apparatus.

The optical system of the preferred embodiment also comprises a condenser means including a condenser lens mount bracket 47 which is U-shaped in cross section and which is slidably mounted with respect to wall 6 by means of rods 48 attached to one side of the bracket 47 and slidably engaging holes in wall 6. A condenser lens barrel 49 is attached to the other leg of bracket 47 and contains a suitable condensing lens or lenses.

A reflecting means includes a bracket 50, containing a suitable mirror or prism, and attached to bracket 47 which extends through an aperture in wall 6, said mirror making an angle of 45° with the optical axis of the objective and condenser lens systems which axis should preferably pass through said mirror at a common point forming the apex of the right angled optical axis of the optical system. The provision of a stationary mirror at such a point in an angular optical axis is already known but it is deemed novel to mount the mirror for movement along one leg of the optical axis together with the condenser means.

Simultaneous movement of the objective and condenser means is effected by an interconnecting mechanical means such as a lever means which may comprise a lever arm 51 pivotally connected at one end to the central portion of the U-shaped bracket 47 by a spacer 52 and bolt 53, and pivotally connected at the other end to objective lens mount plate 40 by a pin 54, or any other suitable means for effecting simultaneous movement of the objective means and condenser means may be used.

A light source means is located adjacent and attached to the condenser means to move therewith. A suitable light source means comprises an electric lamp 55 of desired capacity and having a filament approximating as nearly as practical a point source of light; a lamp socket 56 for said lamp and a lamp bracket 57 pivotally mounted on base 5 by means of ears 58 and bolts 59. A spherical reflector 60 of known type is mounted by a reflector bracket 61 upon the lamp bracket 57 and so located as to focus reflected rays of light upon the condenser or condenser lens system. An insulated wire 162 is used for connection of electric lamp 55 and socket 56 to a source of electrical energy.

The inter-connection between the condenser means and light source means may be accomplished by means of a side arm 62 fastened to the side of lamp bracket 57 and a rod 63 rigidly fastened to condenser lens mount bracket 47, said side arm 62 and rod 63 being hingedly connected by a bolt 64. Thus movement of the objective means in the plane of the objective lens system will be accompanied by movement of the reflecting means, condenser means and light source means along an axis in such a manner that the three elements are always a constant distance from each other.

Another condensing lens may be mounted on one arm of condenser lens mount bracket 47 within a mount 65.

The optical axis of the objective means forms or coincides with one leg of the right angled optical system while the other leg of the angular optical axis is formed by or coincides with the optical axis of the condenser means, said legs meeting at a common point in the reflecting means to form the apex of the right angled optical axis. The walls 6 and 7 are apertured for a suitable area surrounding the optical axis of the condenser means. Lamp 55 and spherical reflector 60 are located with the filament and optical axis respectively on the optical axis of the condensing means.

Another specific embodiment of the invention can be readily applied to known forms of projectors and will now be described. The objective means in this instance also includes a lens barrel 66 containing an objective or objective lens system, one lens 67 of which can be seen in Fig. 3. Lens barrel 66 is mounted in an objective lens mount plate 68 which in turn is rotatably or pivotally mounted on the front of the projector to swing in the plane of the objective or objective lens system in a path concentric with hole 69. A lever means which moves with said objective may comprise a forked or slotted lever arm 70 integral with objective lens mount plate 68.

The condenser means of the second form may include a condenser lens mount plate 71 containing a condenser lens 72, said plate 71 being mounted to move in the plane of the condenser lens 72 and in a path concentric to hole 73. A lever arm 74 is integral with said condenser lens mount plate 71 and slidably engages the forked lever arm 70.

A stationary or fixed reflecting means such as a mirror 75 is located at the intersection or apex of the optical axes of the objective and condenser means and is of sufficient area to allow the necessary shifting of said intersection or apex.

A fixed or stationary light source means is located in optical relation to the condenser means and may comprise lamp 75 with the filament 76 thereof on the optical axis of the condenser means. The film 20 passes between the reflecting and objective means.

The objective, condenser, or objective and condenser lens systems in each embodiment are selected to embody the desired and necessary optical characteristics, but such selection merely involves application of the principles of optics and forms no part of the invention.

The operation of the projector of the invention is as follows:

A reel 12 containing film 20 is mounted on the square-round shaft 10. The film 20 is threaded through the feeding sprocket, gate and pull-down mechanism to reel 13 mounted similarly to reel 12. During the initial run the spring belt 22 encircles pulley 15 and the pulley for reel 13 so that said reel is positively rotated. The optical system is in one position during said initial run, see Fig. 2, and is manually shifted to the position shown in Fig. 1. Whereupon belt 22 is manually shifted to the position also shown in Fig. 1 and the reverse run is made.

Shifting of the optical system of the preferred form causes movement of the objective means in a plane normal to one leg of the right angled optical system while the reflecting, condenser and light source means all move along the other leg of the optical axis. Thus the apex of said optical system remains practically at the same point on the reflecting means, only the axis through the objective means moving around the pivotal support therefor along the surface of a cylinder. The vertical component of this circular movement however is either so small as to be negligible or such that it may be compensated by the usual framing adjustment.

The objective means of the second form moves in a plane normal to one leg of the optical axis upon shifting, and the lever means between said objective means and condenser means effects simultaneous movement thereof since the forked lever arm 70 slidably engages lever arm 74 integral with said condenser means to move the same also in a plane normal to the other leg of the optical axis. In this form of construction as shown the distance from hole 73 to the point of slidable engagement of the levers is greater than the distance from hole 69 to said point of slidable engagement and consequently the objective means is rotated through a slightly greater angle than the condenser means. The result of this difference is that the optical axis is at an angle slightly less than 90° but the condenser lens need not be of as great diameter as would otherwise be necessary.

Since many other variations and modifications of the optical system are possible this disclosure is to be construed in an illustrative and not in a limiting sense.

In the claims which follow the term "optical relation" has been used to mean either that the particular element is optically and physically co-axial or approximately optically and physically co-axial with respect to the element designated.

Having now particularly described my invention what I desire to secure by Letters Patent of the United States and what I claim is:

1. The combination with a motion picture apparatus having an angular optical axis, of an objective means pivotally mounted to swing in a plane perpendicular to one leg of said angular optical axis, a condenser means movable with respect to the other leg of said axis and a lever means between said objective means and condenser means for effecting simultaneous movement thereof.

2. The combination with a motion picture apparatus having an angular optical axis and adapted to receive a film with laterally adjacent frames, of an objective means including an objective lens system and an objective lens mount pivotally mounted and adapted to swing said objective lens system into position before either of said laterally adjacent frames, a condenser means movably mounted, lever means interconnecting said objective means and said condenser means and effecting simultaneous movement thereof, and light source means in optical relation to said condenser means and a constant distance along the optical axis from said objective and condenser means in any position thereof.

3. A photographic optical system having an angular optical axis comprising an objective means pivotally mounted to move in a plane perpendicular to one leg of the optical axis, reflecting means at the apex of said angular optical axis, a condenser means on the other leg of said axis, and lever means between said objective means and condenser means effecting simultaneous movement thereof and shifting of said optical axis.

4. A photographic optical system comprising objective means and condenser means movable in planes parallel to each other and having optical axes perpendicular to each other, a reflecting means at the junction of said optical axes, and mechanical means interconnecting said objective means and condenser means for simultaneous movement thereof.

5. A photographic system having a right angled optical axis comprising an objective means pivotally mounted to move in a plane perpendicular to one leg of the optical axis, reflecting means at the apex of said right angled optical axis, a condenser means movable along the other leg of said optical axis, and lever means between said condenser means and objective means coordinating the movements thereof.

6. A photographic optical system having a right angled optical axis comprising an objective means pivotally mounted to move in a plane perpendicular to one leg of the optical axis, reflecting means at the apex of said right angled optical axis, a condenser means attached to said reflecting means and movable axially along the other leg of said optical axis, and lever means between said condenser means and objective means effecting simultaneous movement thereof.

7. A photographic optical system having a right angled optical axis comprising an objective means pivotally mounted to move in a plane perpendicular to one leg of the optical axis, reflecting means at the apex of said right angled optical axis, a condenser means attached to said reflecting means and movable along the other leg of said optical axis, a light source means at the end of said other leg of the optical axis, and lever means between said condenser means and objective means effecting simultaneous movement thereof, said reflecting means and light source means being at a constant distance from and movable with said condenser means.

8. A photographic optical system having a right angled optical axis comprising an objective means pivotally mounted to move in a plane perpendicular to one leg of the optical axis, reflecting means at the apex of said right angled optical axis, a condenser means movable along the other leg of said optical axis, a light source means including a pivotally mounted lamp bracket pivotally connected to said condenser means and a light source at the end of said other leg of the optical axis, and lever means between said condenser and objective means effecting simultaneous movement thereof.

9. In a motion picture apparatus, the combination with continuous film having laterally adjacent frames of a right angled optical system comprising an objective means having an objective and pivotally mounted to move in a plane parallel to said objective to a position in optical relation to one of said laterally adjacent film frames, reflecting means at the apex of said right angled optical axis, a condenser means attached to said reflecting means and movable along an axis parallel to the plane of the objective to positions corresponding to movement of said objective means, and lever means between said objective means and condenser means effecting simultaneous movement thereof whereby the distance therebetween along the optical axis remains constant.

10. In a motion picture apparatus, the combination with a continuous film having laterally adjacent frames of a right angled optical system comprising an objective means having an objective lens system and pivotally mounted to move in a plane parallel to said lens system to a position in optical relation to one of said laterally adjacent frames, reflecting means at the apex of said right angled optical axis, a condenser means attached to said reflecting means and movable along an axis parallel to said plane to positions corresponding to movement of said objective means, a light source means at a constant distance from and in optical relation to said condenser means, and lever means inter-connecting said objective means and condenser means effecting simultaneous movement thereof whereby said light source means is at a constant distance along the optical axis from said film or said objective means.

11. A photographic optical system comprising objective means and condenser means movable in planes perpendicular to each other, and mechanical means interconnecting said objective means and condenser means for simultaneous movement thereof.

12. A photographic optical system having an angular optical axis comprising objective means pivotally mounted to move in a plane perpendicular to one leg of said optical axis, reflecting means at the apex of said angular optical axis, and condenser means pivotally mounted to move in a plane perpendicular to the other leg of said optical axis, and a lever means interconnecting said objective means and condenser means to effect simultaneous movement thereof.

13. A photographic optical system having an angular optical axis comprising objective means including an objective lens system and an objective lens mount pivotally mounted to move in a plane normal to one leg of said optical axis, a condenser means including a condenser lens system and a condenser lens mount pivotally mounted to move in a plane normal to the other leg of said optical axis, the optical axes of the lens systems coinciding with the respective legs of said angular optical axis, and a lever integral with one of said lens mounts and engaging the other to produce simultanous movement of said lens mounts.

14. A photographic optical system having an angular optical axis comprising objective means including an objective lens system and an objective lens mount pivotally mounted and adapted to move in a plane normal to one leg of said optical axis, reflecting means stationarily mounted at the apex of said angular optical axis, a condenser means including a condenser lens system and a condenser lens mount pivotally mounted and adapted to move in a plane normal to the other leg of said optical axis, and a lever integral with said objective lens mount slidably engaging said condenser lens mount and a stationary light source in optical relation to said condenser means at a constant distance along the optical axis from said reflector means, objective and condenser lens system.

15. In a photographic optical system having an angular optical axis comprising an objective lens mount movable in a plane normal to one leg of the optical axis and provided with a hole for pivotal mounting of said objective lens mount, a condenser lens mount movable in a plane normal to the other leg of the optical axis and also provided with a hole for pivotal mounting of said condenser lens mount, a lever integral with said objective lens mount and slidably engaging said condenser lens mount at a point removed from said hole therein, the distance from the first mentioned hole to the point of slidable engagement of said lever being greater than the distance from the second mentioned hole to said point of slidable engagement whereby said objective lens mount is moved through a greater angle than said condenser lens mount.

16. The combination with a motion picture apparatus having an angular optical axis, an objective lens system forming one leg of said angular optical axis and a condenser lens system forming the other leg of said angular optical axis, of an objective lens mount pivotally mounted and adapted to swing said objective lens system in a plane perpendicular to one leg of said angular optical axis, a condenser lens mount adapted to move said condenser lens system with respect to the other leg of said angular optical axis and a lever means between said objective lens mount and condenser lens mount for effecting simultaneous movement thereof.

17. The combination with a motion picture apparatus having an angular optical axis, an objective lens system forming one leg of said angular optical axis and a condenser lens system forming the other leg of said angular optical axis, of an objective lens mount pivotally mounted and adapted to swing said objective lens system in a plane perpendicular to one leg of said angular optical axis, a condenser lens mount adapted to move said condenser lens system with respect to the other leg of said angular optical axis and a lever means pivotally connected to said objective lens mount and to said condenser lens mount for effecting simultaneous movement thereof.

OTTO WITTEL.